Figure 1:
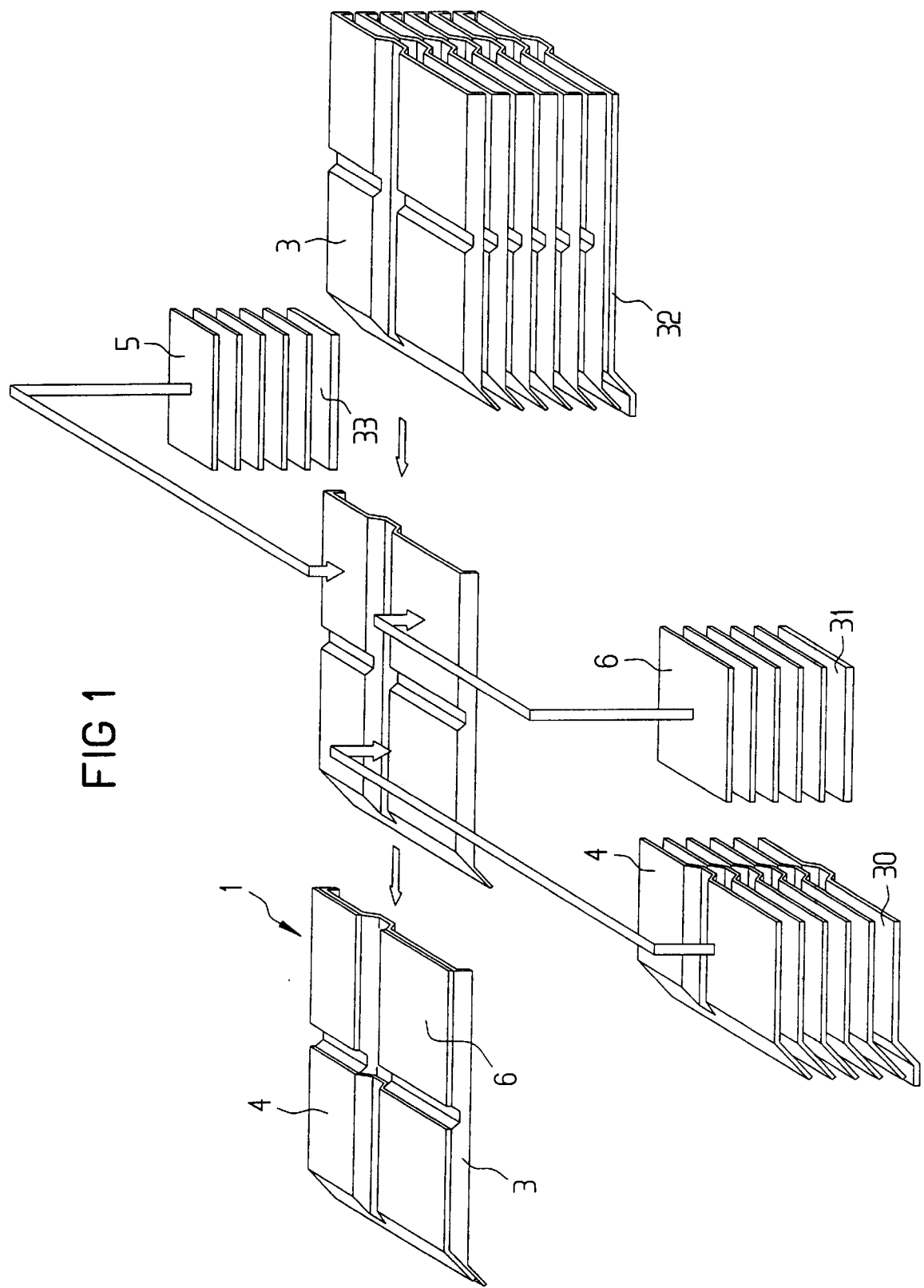

United States Patent [19]
Hoffmann et al.

[11] Patent Number: 5,876,826
[45] Date of Patent: Mar. 2, 1999

[54] MODULAR SOUND-DEADENING COVERING

[75] Inventors: Manfred Hoffmann, Langlingen-Nienhof; Heinz-Dieter Oehl, Celle; Edmund Riggers, Hermannsburg, all of Germany

[73] Assignee: Stankiewicz GmbH, Adelheidsdorf, Germany

[21] Appl. No.: 663,202

[22] PCT Filed: Dec. 22, 1994

[86] PCT No.: PCT/EP94/04277

§ 371 Date: Aug. 26, 1996

§ 102(e) Date: Aug. 26, 1996

[87] PCT Pub. No.: WO95/17320

PCT Pub. Date: Jun. 29, 1995

[30] Foreign Application Priority Data

Dec. 22, 1993 [DE] Germany ............... 43 43 970.5

[51] Int. Cl.⁶ ....................................................... B32B 3/02
[52] U.S. Cl. ........................... 428/95; 156/72; 296/97.23
[58] Field of Search ................. 428/95; 156/72; 296/97.23

[56] References Cited

U.S. PATENT DOCUMENTS

| 4,579,764 | 4/1986 | Peoples, Jr. et al. ............ 428/95 |
| 4,828,898 | 5/1989 | Bailey ................................ 428/95 |

FOREIGN PATENT DOCUMENTS

| 58-63542 | 4/1983 | Japan . |
| 59-32569 | 2/1984 | Japan . |
| 2213097 | 8/1989 | United Kingdom . |
| 2259449 | 3/1993 | United Kingdom . |

*Primary Examiner*—Terrel Morris
*Attorney, Agent, or Firm*—Marshall, O'Toole, Gerstein, Murray & Borun

[57] ABSTRACT

A covering for lining acoustically excited surfaces includes an upper cover layer and a flush fitting lining that adheres to the rear side of the cover layer. The lining has sound deadening properties and is made of a plurality of lining modules. A method of manufacturing such a covering for acoustically excited surfaces includes the steps of forming a cover layer and lining the modules and applying the modules to the cover layer.

17 Claims, 3 Drawing Sheets

MODULAR SOUND-DEADENING COVERING

The invention relates to a covering for lining acoustically excited surfaces, in particular of interior vehicle compartments, and a process for manufacturing the covering.

Shaped and foam-backed coverings, which are adapted to the vehicle floor, following the contours, for sound insulation in the passenger compartment of vehicles, have long been known. For example, DE-OS 20 06 741 describes a multi-layered sound-deadening component which consists of a shaped carpet and a correspondingly shaped weighting layer which are bonded with one another and which are mounted in a floating manner on the car body of the vehicle on a layer of dynamically soft material, such as e.g. foam material. Such a system assumes, along with the function of sound insulation, naturally also a decorative function by means of the carpet surface. In further development of carpets with foam backing, these foam backings have been so effected that they integrally contain feed channels for receiving lines for the vehicle electrical installations, as is set out in DE-PS 37 02 629.

The strict requirements on the recyclability of products are leading to a replacement of the conventional damping coverings, for vibration damping of the car body, especially in the floor group, by sound insulation with integrated carpeting, or to configuration of the damping coverings so that they are removable. Pursuing of the idea of the removability of damping coverings, either for the purposes of effecting repairs or with regard to recycling, the state of the art includes DE-OS 35 10 932 which is concerned with the configuration of the surface of sound insulating parts to be adhesive. The film-like coatings necessary for this purpose consist in substance of two-component polyurethane with sublinking. They are so configured with regard to adhesion that on the one hand they make possible an adherent coupling to the car body panels, which is a necessary prerequisite for body sound damping, and on the other hand a non-destructive removal is made possible. Finally, in accordance with DE-OS 37 10 731, there is made available a damping foam having adhesive surfaces which is likewise removable and which largely takes over the acoustic function of the conventional damping coverings.

Application of foam backing to shaped carpets in closed molds is state of the art. The products manufactured in this way are delivered in large quantities to car manufacturers and are employed in series production.

From the point of view of technical acoustics, the described sound insulation products represent mass-spring systems, with the carpet—usually in association with a weighting layer—as mass, and foam as acoustical spring. For this reason, the dynamic characteristic values of the foam, such as modulus of elasticity and the loss factor for bending vibrations are important characteristic values for the acoustic effect of the system concerned, which has the consequence that for ensuring consistent quality tests of these parameters are to be undertaken. This is required also by DIN-ISO 9000 ff, as applied in the certification procedures for supplier firms.

Total area tests of the acoustic parameters, that is the testing of a complete foam-backed carpet, are not carried out, because of the great effort associated therewith. Also, it can be assumed that because of the shaping of the test object there are effects on the measurement data itself, so that the relevant values cannot be reliably and reproducibly determined. Thus, today, small test bodies having the dimensions of length×width of a few centimetres are removed from defined regions—as planar as possible—of the carpet-foam system, climatically conditioned and tested for modulus of elasticity and loss factor in accordance with the bounce test or the bending vibration test (DIN-53440). In each case, a complete, shaped, completely foam-backed carpet must be available before such a test can be carried out. The disposal of faulty batches is thus, for this reason alone, very costly and significantly disrupts the course of manufacture.

With the aid of the technique of foam backing in the closed mold there can be manufactured sound insulation parts with higher acoustic effectiveness, but the production lines demand significant investments because of the large numbers involved in quantity series delivery for passenger car manufacture. Likewise, changes to the bearing surface, e.g. the floor contour or the end wall, during the series production, necessitates time consuming and costly adaptations, at least for the foam backing mold.

It is thus the object of the invention to provide a covering, in particular for the lining of interior vehicle compartments, which makes possible a flexible adaptation to various acoustically excited contact surfaces with small re-equipping costs, and to provide a method of manufacturing the covering in accordance with the invention.

This object is achieved by providing a plurality of lining modules according to the invention which can be individually attached to the covering, and by an inventive method of manufacturing which includes the forming of lining modules and their assembly with a cover layer.

The invention is based on the insight that a substantially more flexible adaptation to the acoustically excited surface which is to be dealt with, in particular the floor contour or the end wall of an interior vehicle compartment, is provided when the covering is built up in a modular fashion. On an upper cover layer, which can preferably be formed as a carpeting layer, there are therefore arranged a plurality of lining modules which have at least in part sound deadening properties. The lining modules are thereby shaped in such way that they can be applied in each case to the confronting partial surface of the acoustically excited surface in a flush fitting manner.

Each of the lining modules 4–6 can be individually applied to the cover layer and/or to the acoustically excited surface to be lined, firmly but releasably. Thereby, upon recycling, there is provided the advantage that the covering can be separated from the surface to be lined in a simple manner and further that the covering—consisting of various materials—can be separated into its component parts in a simple manner. The releasible bonding may be formed by means of an adhesive coating or other suitable fastening means, such as hook and loop fasteners, press-studs or the like.

The covering may further advantageously have niche-like formations or depressions for receiving supply lines, ventilation channels, electronic components etc.

To improve the sound deadening properties, the sound deadening lining modules may have at the boundary surface to the upper covering layer an additional soft bendable weighting layer so that the mass-spring system is more efficiently formed.

Suitable materials for the lining modules such as foam materials, non-woven fabrics, natural fibres or the like can be compressed to form mats. For improvement of accessibility in the case of repair, the covering layer, may be bonded with the lining modules by means of film hinges or the like. For making the application of the covering more easy it can be provided with mounting fitments which engage into corresponding counterparts to be provided or present on the acoustically excited surface to be compensated.

The process in accordance with the invention for manufacture of the covering can be carried out continuously in a unitary production line. It may, however, also be advantageous to make available for the final installation only the covering layer and the preshaped lining modules, and to effect the final finishing of the covering directly prior to installation of the same.

Figure 2:
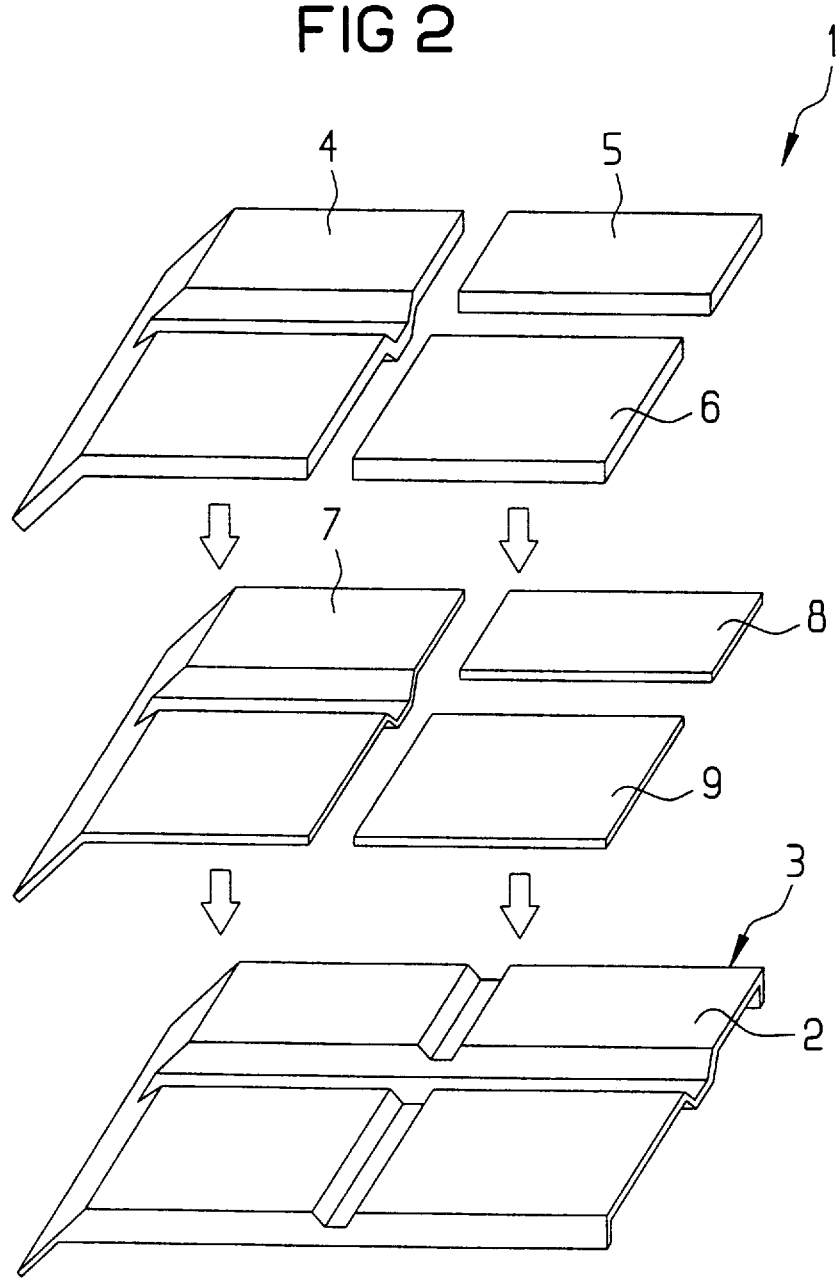
Figure 3:
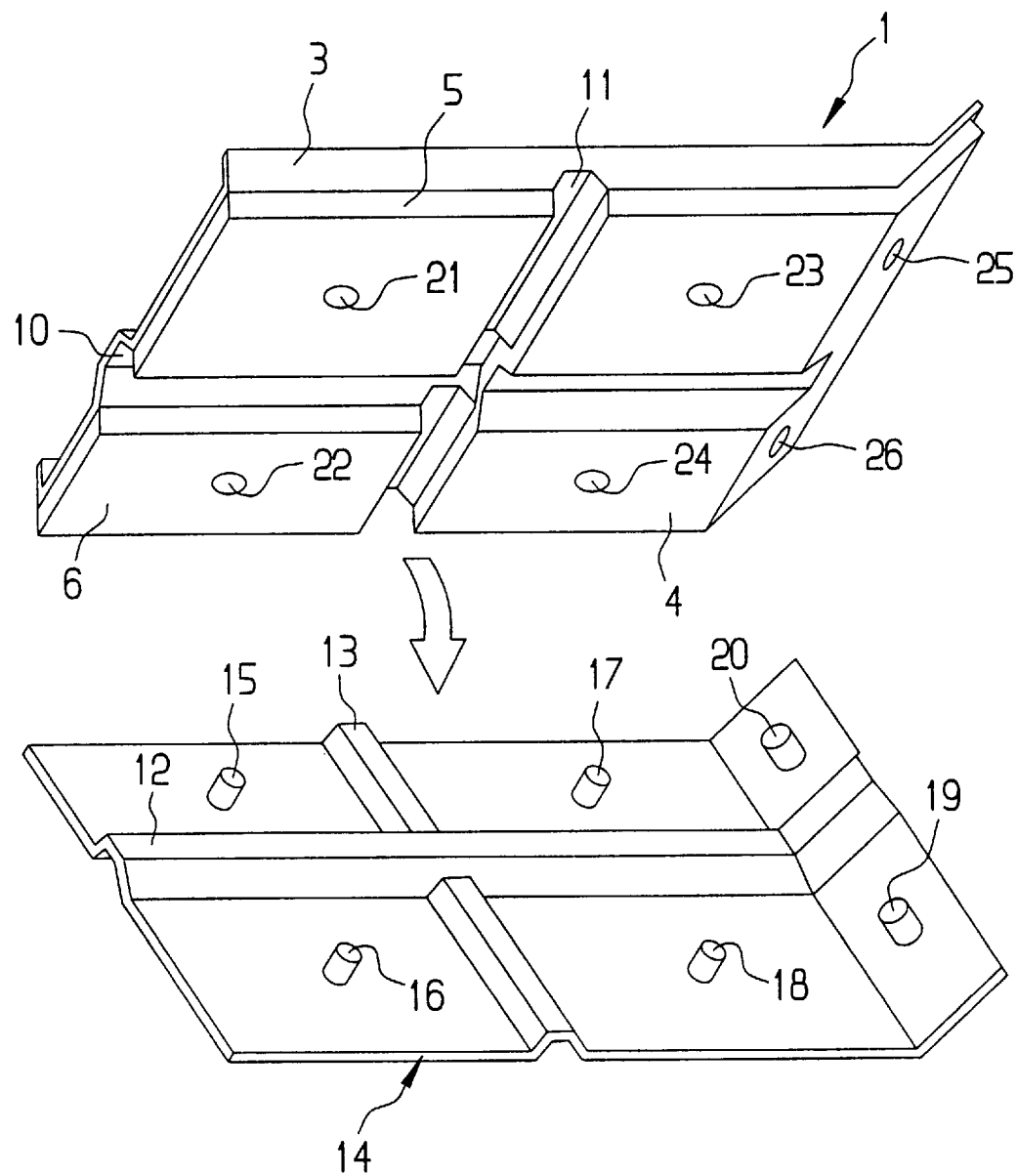

The invention will be described below by way of example, with reference to the exemplary embodiments shown in the drawings, which show:

FIG. 1 a schematic representation for explanation of the manufacture and make-up of the covering in accordance with the invention, FIG. 2 a schematic representation for explanation of an advantageous construction of the covering in accordance with the invention, FIG. 3 a schematic representation for explanation of the installation of the covering in accordance with the invention.

First, the make-up of the covering in accordance with the invention will be explained with reference to FIG. 2.

With the covering 1 in accordance with the invention, the rear side 2 of the cover layer 3 is used as the coupling surface for the various lining modules 4–6. Since, consequently, no closed mold foam-backing is provided, more economical carpeting can be employed as the cover layer 3, since as a consequence no complicated blocks against foam penetrations, which contaminate the carpet surface and make the part unusable, are needed. The lining modules 4, 5, 6, acting as acoustics springs, may be of foam 4 or non-woven fabric 5, 6, (the non-woven fabrics may be synthetic non-woven fabrics or cotton fibre non-woven fabrics), or also of natural (renewable resource) fibres. These are manufactured separately and thus can be made available in the necessary quantity for short run cycles on the production line. FIG. 2 shows the modularly made up covering in an overview. Advantageously, there may be provided between the cover layer 3 and the lining modules 4, 5, 6, a weighting layer 7, 8, 9 which increases the mass.

There are thus many possibilities to meet the applicable acoustic requirements by means of the placing of different materials within a carpeting part. It is known from the publication "Advance Noise Control in Automotive Engineering, Technomic Publishing Company, USA, 1987 (also Stankiewicz GmbH-Information No. 130, 1987)" that the transmission of noise from the engine compartment to the passenger compartment occurs in no way uniformly over the surface but rather that, with the aid of intensity measuring techniques, locally restricted sound sources and sound sinks can be located. In the region of the sound sources, the noise flow vector is directed into the passenger compartment and in the region of the sound sinks the vector has the reversed direction, that is, outwardly out of the passenger compartment. By means of steps such as e.g. the provision of air cushion foils in acoustic foam is there can be deliberately established acoustic short-circuits, also called hydrodynamic short-circuits, which make possible an energy cancellation via a direct path.

These energy components then no longer reach the ear of the driver or of the passengers.

Further, by means of the invention, one is presented with a means by which there can be achieved individual damping of the sound sources of different strengths and also the strengthening of the sound discharge via the sinks, by means of selected parameters for foam 4 or non-woven fabric 5, 6, and also in combination of both materials.

By means of the process itself, it is made possible that non-acoustically effective modules for electronic parts, air ducting etc. can be accommodated in the vehicle floor and end wall region before the installation of the acoustic carpeting, so that the overlying covering 1 with the lining modules 4–6 need only be laid on the floor groups and by means of the special configuration of the rear side 2 of the cover layer 3 and, if applicable, also by means of the adhesive coating of the surfaces of the lining modules, on the one hand an adherent coupling is provided but on the other hand the cover layer 3 and the acoustic modules allow themselves to be easily removed individually. So far as replacement parts are needed in the case of repair, these can be made available economically as individual parts. By means of the modular covering 1, at the same time a simple recycling is possible.

The coupling of the individual lining modules 4–6 to the cover layer 3 can be provided e.g. by means of hook and loop fastenings or by means of adhesive coatings of the surfaces, advantageously also by means of heat-activatable adhesive coatings, and considered overall advantageously thus by means of releasable bondings. There are also provided locally restricted foam coverings of the lining modules 4–6 in the manner of a sealing with simultaneous coupling to the coupling surface.

The intermediate provision of soft bendable weighting layers 7–9 for sound deadening between the cover layer underside 2 (i.e., the rear side 2 of the cover layer 3) and the various modules 4–6 increases the acoustic effect of the overall system. In accordance with the inventive insight, the bondings between the various modules 4–6 and the weighting layers 7–9, and between the weighting layers 7–9 and the cover layer rear side 2 are effected in the same manner as described above. Since the weighting layers 7–9 have sufficient rigidity, there may be provided between the weighting layers 7–9 and the cover layer 3 also press-stud connections.

For e.g. servicing purposes accessibility to the individual modules 4–6 is required. For this purpose, film hinges is can be applied in the cover layer so that account is taken of this consideration. For secure positioning of the modular covering 1, there may be provided, as shown in FIG. 3, installation fitments 10, 11 which make use of protrusions 12, 13 or depressions occurring in the vehicle floor 14 and in the end wall, which have their corresponding parts 10, 11 in the pre-fabricated lining modules 4–6, e.g. in the shaped foam 4. There may also be employed for secure mounting, fixing points separately applied in the end wall/floor region, e.g. pins 15–20, which engage into corresponding counterparts 21–26 in the covering.

By means of the present invention, the methods for quality assurance are advantageously constituted since all parts, in particular however the modules 4–6, can be individually checked. So far as a non-destructive mold checking is not possible, the loss of value with the modules 4–6 is very limited, because the complete part 1 need not itself be destroyed. The checking of the covering quality (of a carpet) is, in the industry, usually carried out as part of the manufacture itself, so that for the bringing together to the modular covering 1 as a rule only an optical checking of the colour will then need to be carried out.

By means of the invention, two methods for the manufacture of the modular covering 1 are encompassed. On the one hand, the covering 1 may be produced completely by the manufacturer of the sound insulation and delivered to he user in the car industry. Another procedure, illustrated in FIG. 1, consists in, hat the sound deadening module 4 is assembled by the manufacturer of the sound insulation and the non-acoustically effective modules 5, 6 are prepared by the vehicle manufacturer, so that the components 3–6 need then only be assembled together in the described simple manner.

The cover layer shaping and the cutting are effected in separate items of equipment in accordance with the known state of the art, whereby the weighting layers 7–9 may also be formed in direct connection with the covering layer 3. The recycling of a cover layer—weighting layer combination can be carried out in a technically relatively simple way. The component parts can be recovered separately as weighting layers 7–9 and covering layer 3, e.g. carpet components.

For the manufacture of the modular covering, the modules 4–6 and the cover layer 3 are expediently, as shown in FIG. 1, made available in pre-shaped carrier shells 30–33, whereby the shaping corresponds to the contour of the floor-/wall region. The individual modules 4–6 are preferably brought to the predetermined positions by means of freely programmable robots, which e.g. is then advantageous when the overall system is constructed at the sound insulation manufacturers. Insofar as the assembling together should be effected at the vehicle producer or in combination with the sound insulation manufacturer, the rear side 2 of the cover layer 3, as coupling surface, must be provided with the above-described adhesion couplers. Taking into account also the fixing points 15–20 for the installation, there is then possible a secure positioning of the covering 1.

A significant advantage of the invention consists in that different coverings can be manufactured at a single production line, e.g. through rapid exchange of the carrier shells 30–33 and selection of the associated program for the placement. By means of pre-production and availability of the modules 4–6 at the production line, production run cycles which are significantly reduced with regard to the state of the art are possible. Alterations of the modules 4–6 during series production can be reacted to flexibly and rapidly.

The foam-backing technique can at least be largely avoided, whereby on the one hand economical carpets—not suitable for foam backing—can be employed and on the other the assembly together of the modules can be effected either by the manufacturer of sound insulation produces or by the vehicle manufacture.

We claim:

1. A covering for lining an acoustically excited surface comprising an upper cover layer and a plurality of lining modules, each module being independently formed and firmly adhered to a rear side of the cover layer such that said covering is configured to flush fit against a confronting partial surface of the acoustically excited surface, wherein at least one of the lining modules has sound-deadening properties.

2. The covering of claim 1, wherein the lining modules firmly but removably adhere to the cover layer and, optionally, the acoustically excited surface.

3. The covering of claim 2, wherein a releasable covering is disposed between the lining modules and the cover layer and, optionally, the acoustically excited surface.

4. The covering of claim 1, wherein at least one of the lining modules has at least one niche for receiving at least one of supply lines, ventilation channels and electronic components.

5. The covering of claim 1, wherein the lining modules are formed, with sound-deadening properties, as acoustically effective mass-spring systems.

6. The covering of claim 1, wherein there is additionally provided a soft bendable weighting layer between the rear side of the cover layer and an upper side of the lining modules.

7. The covering of claim 1, wherein the lining modules comprise a compressible material.

8. The covering of claim 1, wherein the cover layer has sound-deadening properties.

9. The covering of claim 1, wherein an upper side of the cover layer is a carpeting layer.

10. The covering of claim 1 wherein the cover layer is bonded with the lining modules by means of film hinges.

11. The covering of claim 1, wherein the lining modules have mounting fitments.

12. A method of manufacturing a covering for lining an acoustically excited surface comprising the following steps:

forming and shaping a cover layer;

forming and shaping a plurality of lining modules;

applying attachment elements to said lining modules and said cover layer or covering an upper side of said lining modules and a rear side of said cover layer with a releasable coating and;

assembling the covering by application of said lining modules on to the rear side of said cover layer and adherently bonding the same.

13. The method of claim 12, wherein all process steps are carried out in one automated production line.

14. The method of claim 12, wherein the first two process steps are performed temporally and spatially separately from the assembly of the covering.

15. The covering of claim 3 wherein the releasable covering is selected from the group consisting of an adhesive coating and hook and loop fasteners.

16. The covering of claim 7 wherein the lining modules are of a material selected from the group consisting of foam, non-woven fabrics, and natural fibers.

17. The covering of claim 2 wherein said lining modules are adhered to said cover layer and said acoustically excited surface by press-studs.

* * * * *